(12) United States Patent
Shen et al.

(10) Patent No.: US 7,457,926 B2
(45) Date of Patent: Nov. 25, 2008

(54) CACHE LINE REPLACEMENT MONITORING AND PROFILING

(75) Inventors: Xiaowei Shen, Hopewell Junction, NY (US); Yefim Shuf, Millwood, NY (US); Peter F. Sweeney, Spring Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 11/131,972

(22) Filed: May 18, 2005

(65) Prior Publication Data

US 2006/0265542 A1 Nov. 23, 2006

(51) Int. Cl.
*G06F 12/00* (2006.01)
*G06F 13/00* (2006.01)
*G06F 13/28* (2006.01)

(52) U.S. Cl. .................. 711/156; 711/133; 711/118; 711/221

(58) Field of Classification Search .................. 711/156
See application file for complete search history.

(56) References Cited

U.S. PATENT DOCUMENTS

| | | | |
|---|---|---|---|
| 4,748,556 A | 5/1988 | Hoeren et al. | |
| 5,019,971 A | 5/1991 | Lefsky et al. | |
| 5,274,790 A | 12/1993 | Suzuki | |
| 5,396,609 A | 3/1995 | Schmidt et al. | |
| 5,752,261 A | 5/1998 | Cochcroft, Jr. | |
| 6,003,115 A * | 12/1999 | Spear et al. | 711/137 |
| 6,219,760 B1 | 4/2001 | McMinn | |
| 6,490,654 B2 | 12/2002 | Wickeraad et al. | |
| 6,557,080 B1 | 4/2003 | Burger et al. | |
| 6,560,676 B1 | 5/2003 | Nishimoto et al. | |
| 6,625,695 B2 | 9/2003 | Fanning | |
| 6,901,483 B2 * | 5/2005 | Robinson et al. | 711/133 |
| 2001/0001873 A1 * | 5/2001 | Wickeraad et al. | 711/136 |
| 2001/0021966 A1 | 9/2001 | Kawasaki et al. | |
| 2003/0126354 A1 | 7/2003 | Kahn et al. | |
| 2004/0205307 A1 * | 10/2004 | Pullen et al. | 711/158 |

OTHER PUBLICATIONS

Stephen J. Fink, et al., Design, Implementation And Evaluation Of Adaptive Recompilation With On-Stack Replacement, 2003.
Peter F. Sweeney, et al., Using Hardware Performance Monitors To Understand The Behavior Of Java Applications, 2003.
Matthew Arnold,. et al., Adaptive Optimization In The Jalapeno JVM, *ACM SIGPLAN, Conference on Object-Oriented Programming, Systems, Languages, and Applications (OOPSLA'00)*, pp. 15-19, Oct. 2000.

\* cited by examiner

*Primary Examiner*—Kevin Ellis
*Assistant Examiner*—Prasith Thammavong
(74) *Attorney, Agent, or Firm*—F. Chau & Associates, LLC

(57) ABSTRACT

Systems and methods for cache replacement monitoring (CRM) are provided. The system includes a monitored cache comprising a monitored cache line set, the monitored cache line set comprising at least one cache line capable of holding data of a monitored address; and a CRM mechanism operatively associated with the monitored cache. The CRM mechanism collects CRM information for the monitored address. The method includes the steps of collecting CRM information for a monitored address in a monitored cache; and recording the CRM information for the monitored address, when at least one of (1) the monitored address is cached in the monitored cache, (2) the monitored address is replaced in the monitored cache, (3) any cache line in a cache line set corresponding to the monitored address is cached in the monitored cache, and (4) any cache line in a cache line set corresponding to the monitored address is replaced in the monitored cache.

1 Claim, 3 Drawing Sheets

CACHE LINE REPLACEMENT MONITORING AND PROFILING

GOVERNMENT RIGHTS STATEMENT

This invention was made with Government support under Contract No. NBCH30390004 awarded by Defense Advanced Research Projects Agency DARPA. The Government has certain rights in this invention.

BACKGROUND OF THE INVENTION

1. Field of the Invention

The present invention relates to cache systems, and, more particularly, to cache replacement monitoring and profiling.

2. Description of the Related Art

Software-controlled prefetching is a technique that may be used to reduce memory latency by attempting to load data into a cache before the data is used for some computation. Most modern architectures provide instructions to explicitly prefetch data. However, the hardware in current implementations of modern architectures provides little feedback to determine the effectiveness of the prefetching. In some cases, unnecessary prefetching may degrade effective memory latency by wasting precious memory bandwidth or by causing unnecessary cache thrashing.

Consider the following sequence of operations (wherein "use" represents either a memory read or a memory write operation, and X, Y and Z are variables with memory addresses corresponding to different cache lines):

(1). use X;
(2). use Y; and
(3). use Z.

Assume that the system uses a 2-way set associative cache with a least recently used ("LRU") replacement policy and variables X, Y, and Z are all mapped to the same cache line set. If the two cache lines corresponding to X and Y are initially cached in the cache, the use of variable Z would cause a cache miss, indicating that variable Z is a good candidate for prefetching. Consider that "prefetch Z" is inserted before "use Y":

(1). use X;
(2). prefetch Z;
(3). use Y; and
(4). use Z.

If the cache line corresponding to variable Z arrives before variable Y is used, "prefetch Z" needs to replace variable Y. Consequently, "use Y" will cause a cache miss because variable Y has been replaced by the prefetch. Now consider that "prefetch Z" is inserted just before "use X":

(1). prefetch Z;
(2). use X;
(3). use Y; and
(4). use Z.

In the worst case, "prefetch Z" will replace variable X causing "use X" to generate a cache miss. When variable X is brought into the cache, variable X will replace variable Y, causing "use Y" to generate a cache miss that will replace variable Z before variable Z is used. In a better but still bad case, "prefetch Z" will replace variable Y causing a cache miss on "use Y" and subsequently replace variable Z, which will cause a cache miss on "use Z". The performance problems associated with prefetching and cache conflicts can be difficult to understand and track.

SUMMARY OF THE INVENTION

In one aspect of the present invention, a system for cache replacement monitoring (CRM) is provided. The system includes a monitored cache comprising a monitored cache line set, the monitored cache line set comprising at least one cache line capable of holding data of a monitored address; and a CRM mechanism operatively associated with the monitored cache. The CRM mechanism collects CRM information for the monitored address.

In another aspect of the present invention, a method of cache replacement monitoring (CRM) is provided. The method includes the steps of collecting CRM information for a monitored address in a monitored cache; and recording the CRM information for the monitored address, when at least one of (1) the monitored address is cached in the monitored cache, (2) the monitored address is replaced in the monitored cache, (3) any cache line in a cache line set corresponding to the monitored address is cached in the monitored cache, and (4) any cache line in a cache line set corresponding to the monitored address is replaced in the monitored cache.

In yet another aspect of the present invention, a method for determining a benefit for a potential optimization is provided. The method includes the steps of (a) monitoring an execution of a program with respect to a monitored cache; (b) determining at least one monitored address in the monitored cache; (c) collecting CRM information on the at least one monitored address; and (d) determining a benefit for a potential prefetching optimization using the collected CRM information.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1:
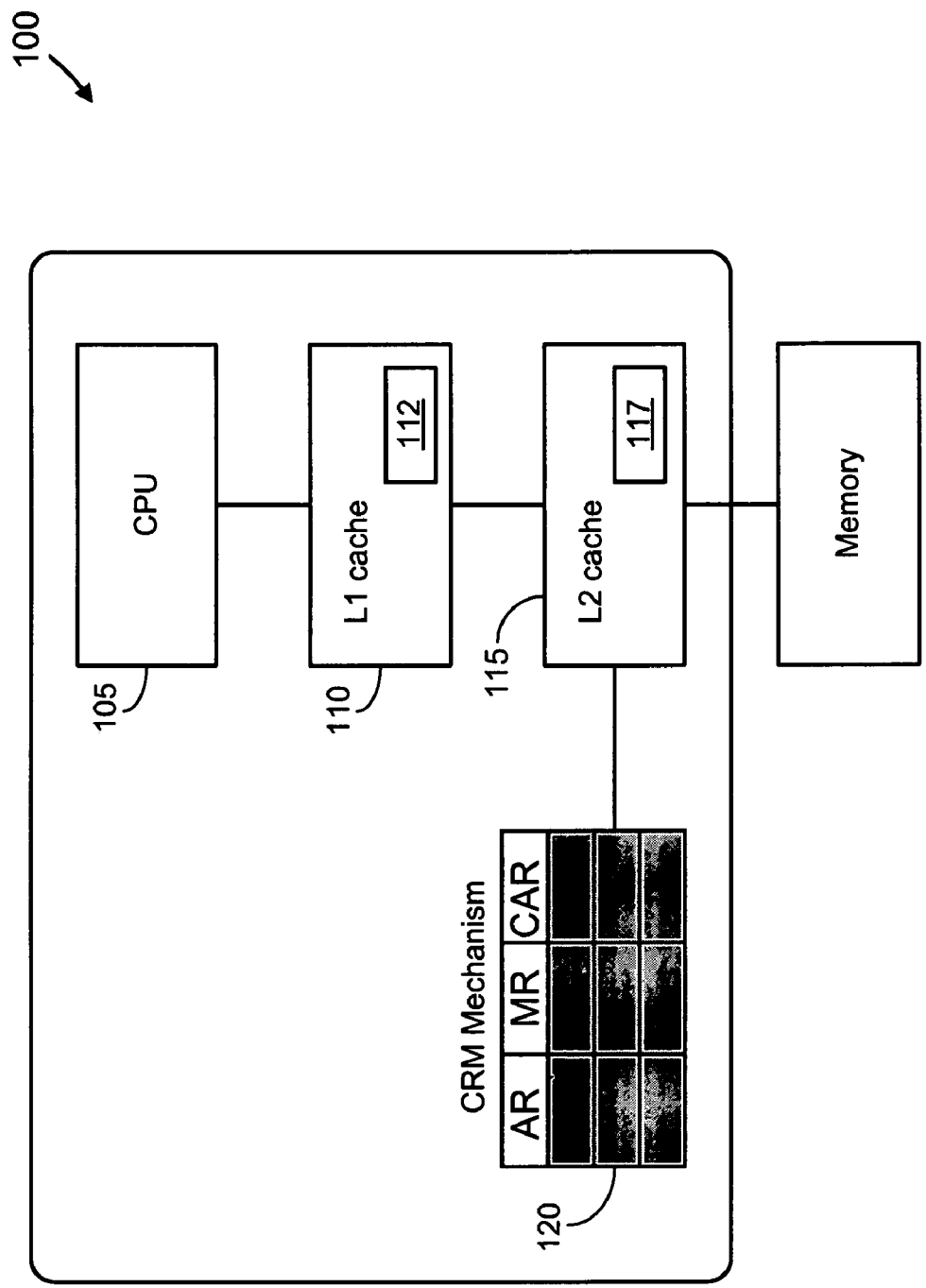
FIG. 1 depicts a block diagram of a processor-based system using the CRM mechanism, in accordance with one exemplary embodiment of the present invention.

Illustrative embodiments of the invention are described below. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

We present, in exemplary embodiments of the present invention, a cache Replacement Monitoring ("CRM") mechanism that monitors (1) the number of times a monitored cache line, or any cache line in a monitored cache line set, is replaced; (2) the memory addresses that have recently replaced the monitored cache line, or any cache line in the monitored cache line set; (3) the memory addresses that have recently been replaced by the monitored cache line, or any cache line in the monitored cache line set; and (4) the time interval between two recent replacements of a monitored cache line or any cache line in the monitored cache line set, wherein the time interval can be measured by the number of processor cycles, the number of instructions, the number of memory access instructions or the number of cache accesses.

The CRM information collected by the CRM mechanism can help determine numerous system properties, including (1) predicting whether the working set of a program is appropriate for a cache with a given cache geometry, (2) detecting cache thrashing or lock contentions, and (3) determining the effectiveness of software prefetching. Determining or detecting such system properties can be helpful for understanding an application's behavior and for improving an application's performance. The CRM mechanism described herein can be provided for any cache level in a cache hierarchy, such as L1, L2, or L3, as contemplated by those skilled in the art.

Architecture Support for CRM

Referring now to FIG. 1, a computer system with CRM support is illustrated, in accordance with one exemplary embodiment of the present invention. The system 100 includes a central processing unit ("CPU") 105, an L1 cache 110, an L1 cache controller 112, an L2 cache 115, an L2 cache controller 117, and a CRM mechanism 120. As previously noted, the use of the L1 cache 110 and the L2 cache 115 are only exemplary; any number of caches in any of a variety of constructs may be used as contemplated by those skilled in the art. The L1 cache controller 112 and the L2 cache controller 117 may collectively be referred to simply as "cache controller." The CRM mechanism 120 includes a CRM table with a plurality of table entries. Each table entry is further comprised of (1) an address register ("AR") that records the memory address associated with a monitored cache line, (2) a monitor register ("MR") that records the number of times the cache line has been replaced, and (3) a conflicting address register ("CAR") that records one or more recent replacing memory addresses that have recently replaced the monitored cache line.

As used herein, the term "program" may include any combination of software, hardware and firmware for providing instructions and/or data to the CRM mechanism 120. The program may specify the memory address to be monitored and set the AR. At a later time, the program may read the corresponding MR and CAR to collect the monitored information.

The monitoring of a cache line may be initiated by an action to the memory address. In one embodiment of the present invention, the monitoring of a cache line may be initiated when the program writes the memory address directly to the AR. Alternatively, the program may use an instruction with an index to the CRM table.

When monitoring of a cache line is initiated, the MR may be set to zero and the CAR may be set to empty. When a cache line is to be replaced, the L2 cache controller 117 checks the CRM table. If the cache line is found in an entry of the CRM table, the cache controller increments the replacement counter MR up to a maximum value, and records the address of the replacing memory address in the replacement history CAR. The CRM mechanism 120 can be configured to initialize the MR to a value and to generate an interrupt when the MR reaches a predefined value.

It should be understood that, given a memory address, the CRM mechanism 120 can be performed for the corresponding cache line, or the corresponding cache line set (in an associative cache) to which the memory address is mapped. This can be specified by either the software or the hardware.

It is further understood that the CRM mechanism 120 can be performed for any cache in the particular cache hierarchy being implemented. For example, in FIG. 1, the CRM mechanism 120 is employed to monitor cache replacements of the L2 cache 115. In an alternate embodiment, the CRM mechanism 120 may be employed to monitor cache replacements in the L1 cache 110 or an L3 cache (not shown).

In an alternative embodiment, a cache line may have an associated state that is used to maintain cache coherency and the cache line state may be augmented with a monitor flag to indicate whether a cache line is being monitored. Use of the monitor flag may reduce overhead for searching the CRM table. When a cache line is to be replaced, if the cache line state indicates that the cache line is being monitored for replacement, the corresponding entry in the CRM table is updated; otherwise the CRM table is not accessed.

The CRM mechanism 120 can monitor other useful replacement related information. For example, the CRM mechanism 120 can monitor the number of cycles between two replacements of a cache line, or the number of cycles from the time a cache line at a memory address is replaced from the cache to the next time the cache line at that memory address is brought back into the cache. A straightforward implementation may record proper timestamp information for the most recent replacement of the monitored cache line, and may use this information to deduce the time interval when another replacement of the cache line happens or when the memory address associated with the replaced cache line is cached again. A short time interval can be a good indication that the corresponding cache set (in an associative cache) is heavily used. This information can be used, for example, to help dynamically change the layout of data to reduce performance degradation due to frequent accesses to the same cache line in a cache.

The CRM mechanism 120 can monitor which cache lines in a cache line set have been accessed. A straightforward implementation may associate a reference flag with each cache line in the cache set corresponding to a cache entry in an AR. When a memory address is written into an AR, the reference flags of the cache lines associated with that AR are turned off. The cache controller checks the CRM table when a cache line is accessed. If the cache line set is being monitored according to the CRM table, the cache controller turns on the associated reference flag.

When a monitored memory address is prefetched and brought into the cache, replacing a cache line, the CRM mechanism 120 can monitor whether the replaced cache line is accessed before the prefetched memory address is accessed, which can help determine if the monitored memory address has been prefetched too early.

In summary, the CRM mechanism 120 can monitor runtime information including, but not limited to, the following:

The number of times a cache line associated with a monitored memory address has been replaced.

The memory addresses that have caused recent replacements of the monitored cache line.

The memory addresses that have been replaced by the monitored cache line.

The number of times any cache line in the monitored cache line set has been replaced.

The memory addresses that have caused recent replacements of any cache line in the monitored cache line set.

The memory addresses that have been replaced by any cache line in the monitored cache line set.

The time interval between the time when the monitored memory address is brought into the cache and the time when the monitored memory address is replaced.

The time interval between the time when the monitored memory address is replaced and the time when the monitored address is brought into the cache again.

The time interval between two recent replacements of the monitored memory address.

The time interval between the time when any cache line in the monitored cache line set is brought into the cache and the time when any cache line in the monitored cache line set is replaced.

The time interval between the time when any cache line in the monitored cache line set is replaced and the time when any cache line in the monitored cache line set is brought into the cache.

The time interval between two recent replacements of any cache line in the monitored cache line set.

The time interval between the time when any cache line in the monitored cache set is brought into the cache and the time when that cache line is replaced.

The time interval between the time when any cache line in the monitored cache set is replaced and the time when that cache line is cached again.

The time interval between two recent replacements of a particular cache line in the monitored cache line set.

The cache lines in the monitored cache line set that have been recently accessed.

It should be noted that the address of the memory block kept in a CAR may include at least one of the following: a virtual address of the memory block, or a physical address of a memory block. For instance, in a cache that is physically tagged, at least the physical address of a memory block needs to be kept in a CAR as part of the history.

One skilled in the art will realize that when a cache line is replaced by the monitored memory block, usually only the physical address of the memory block corresponding to the replaced cache line can be retrieved from a physically-tagged cache. If a virtual address is preferred, an inverse address translation mechanism, which maps a physical address to one or more virtual addresses, may be employed.

Software Prefetching via CRM-Based Profiling

The CRM mechanism 120, described in greater detail above, can help evaluate the potential benefit of prefetching before an optimization is applied, and the effectiveness of prefetching after the optimization is applied. As a result, memory bus bandwidth and cache space can be preserved by preventing unnecessary prefetching.

Consider again the following exemplary program where time goes from high to low:

1. use X;
2. use Y; and
3. use Z.

where "use V" represents either a read or write to the variable V. If "use Z" causes a cache miss, then variable Z is a candidate for prefetching. Assume that we have a two way set associative cache with a least recently used ("LRU") replacement policy within a cache set) and variables X, Y, and Z are mapped to the same cache set.

By monitoring the time interval between two accesses to a cache line in a cache set, the potential benefit of prefetching can be measured. The time interval determines the number of cycles before a "use" that a prefetch can be placed without increasing the number of cache misses. For example, assume we monitor the cache set associated with variable Z in our example above. When there is a cache miss on access to variable Z, we can tell the time interval since the last cache access to each cache line in variable Z's cache set. If the time interval was too short, then prefetching variable Z will not be beneficial. However, if the time interval was sufficiently long, "prefetch Z" may be beneficial.

Furthermore, after a "prefetch Z" has been inserted into the code, we need to evaluate its impact on performance. The evaluation determines if variable Z has been loaded into the cache before "use Z" occurs. If not, "prefetch Z" should be moved earlier in the code. The evaluation determines if variable X is accessed in "use X" after variable X has been replaced by variable Z but before "use Z". In this case, "prefetch Z" is placed too early and needs to be moved later in the code.

Managed Runtime Environment Using CRM-Based Profiling

This section demonstrates how a managed runtime environment ("MRE"), such as an adaptive optimization system ("AOS") in a Java virtual machine ("JVM"), can use the CRM mechanism 120 to effectively implement software prefetching. We assume that the MRE is comprised of (1) a controller that monitors application behavior and determines the appropriate actions that should be taken to improve application behavior, and (2) a runtime, dynamic compiler that can generate the code sequences to access the CRM.

An example of an adaptive optimization system can be found in "Adaptive Optimization in the Jalapeño JVM" published in OOPSLA 2000. Most implementations of modern micro architectures provide a mechanism to program hardware performance monitor ("HPM") registers either to count the number of times a particular hardware event occurs, or to sample the instruction and operand addresses that caused a HPM event to occur after the event has occurred some predefined number of times.

In addition, Intel® Itanium's HPM functionality provides a branch table buffer ("BTB") that records a fixed number of branches that were last taken. The BTB can be used to identify the context in which a HPM event occurs by reading the contents of the BTB.

An example of how a MRE can access hardware performance monitors can be found in "Using Hardware Performance Monitors to Understand Java Application" published in VM 2004.

The MRE's controller monitors application's execution to determine opportunities for software prefetching. In particular, the controller programs the hardware performance monitors to sample the instruction and operand addresses that cause a miss in a particular level of the memory hierarchy. Initially, the controller might concentrate on L2 or L3 misses as they are more expensive to satisfy than L1 misses. When an instruction address and the instruction's operand address are sampled, the context in which the HPM event occurred is also recorded as the contents of the BTB. A prefetch candidate is the address of an instruction that has been sampled, the instruction's operand address, and the instruction's context as defined as the contents of the BTB when the sample occurred.

Once a set of one or more prefetching candidates have been identified, the controller does the following for each candidate:

1. Determines if prefetching the prefetch candidate's operand is potentially beneficial;
2. Determines the appropriate program point to insert a prefetch instruction; and
3. Evaluates the benefit of the prefetch instruction.

The potential benefit from prefetching can be determined by monitoring the cache set of the prefetch candidate's operand address to record the access activity to the cache entries in the set. If all the cache entries in the set are accessed just before the prefetch candidate's instruction address, prefetching will not be beneficial as the cache set is "hot"; that is, the prefetched data will be replaced before it is used. On the other hand, if at least one of the cache entries has not been replaced just before the prefetch candidate's instruction address, prefetching may be beneficial.

To monitor the appropriate cache set requires knowing the prefetch candidate's operand address. For a prefetch candidate and its context, the controller could use the compiler to determine the earliest point along the context path that the prefetch candidate's operand address is known. The compiler would use def-use chains of the appropriate program variables to determine the earliest point. Once the earliest point is known, the controller could use the compiler to insert instructions at that earliest point to program the CRM mechanism 120 to start monitoring the cache set of the prefetch candidate. In addition, the compiler could reorganize or duplicate computation to provide the operand address earlier in the path. The controller uses the compiler to insert instructions after the prefetch candidate's instruction address to read the CRM and invoke the MRE with the CRM's MR and CAR. After instrumentation, the compiler compiles the modified parts of the application code and returns control to the MRE. The MRE ensures that the instrumented code is executed by either passively waiting until the next invocation of the instrumented code or actively using an on-stack replacement technique to change the executing code to the new instrumented code. An example of the on-stack replacement technique can be found in "Design, Implementation, and Evaluation of Adaptive Recompilation with On-Stack Replacement" published in CGO 2003 by S. Fink and F. Qian.

After the instrumented code has executed for a predefined interval of time and the MRE has obtained enough MR and CAR values, the MRE analyzes the MR and CAR values to evaluate potential benefit from prefetching.

If the prefetching appears not to be beneficial, the controller could try various alternatives, such as alternative allocation strategies, to ensure that the cache set is not hot, and then reevaluate potential benefit from prefetching of the prefetch candidate.

Assuming that prefetching is determined to be potentially beneficial, the controller may determine the program point at which to insert the prefetch instructions as follows. The controller uses the access information to the cache set to determine prefetch latency, which is the greatest number of cycles since a cache line has been replaced in the cache set. The controller uses the context and prefetch latency to identify the program point to insert the prefetch instruction. From the prefetch candidate's program counter, a prefetch point is identified by following the context backwards prefetch latency cycles.

To measure the effectiveness of a prefetch instruction, the compiler inserts instructions at the prefetch instruction to program the CRM mechanism 120 to monitor the prefetch candidate's cache set, and inserts instructions after the prefetch candidate is accessed to access and pass the MR and CAR values of the CRM mechanism 120 to the controller. The controller examines the MR and CAR values to evaluate if the correct program point was chosen to insert the prefetch instruction. On the one hand, if the prefetch candidate's data is not available when accessed, the prefetch needs to be moved earlier in the program's execution. On the other hand, if the prefetch replaces a cache line that is accessed before the prefetch data is accessed, then the prefetch instruction must be moved later in the application's execution. If a prefetch instruction cannot be placed sufficiently early in the code to reduce the access latency, alternative optimizations that layout data structures differently may be used, as contemplated by those skilled in the art.

After a prefetch instruction is determined to be beneficial, the instructions to program the CRM mechanism 120 to evaluate the benefit of prefetch can be eliminated.

If at a later point in time during the application's execution, the prefetch candidate starts missing in the cache, the process is restarted as the program might have gone through a change in behavior that invalidates the earlier prefetching decision.

If a prefetch candidate has multiple dominant contexts, the above process can be applied to each dominant context.

When there are multiple prefetch candidates, start with the candidate that has a single dominant context that has a high sample rate.

One who is skilled in the art will recognized that a binary editor could be used instead of a compiler to modify the application's executable directly to insert the appropriate CRM instructions without having to recompile the application.

Figure 2:
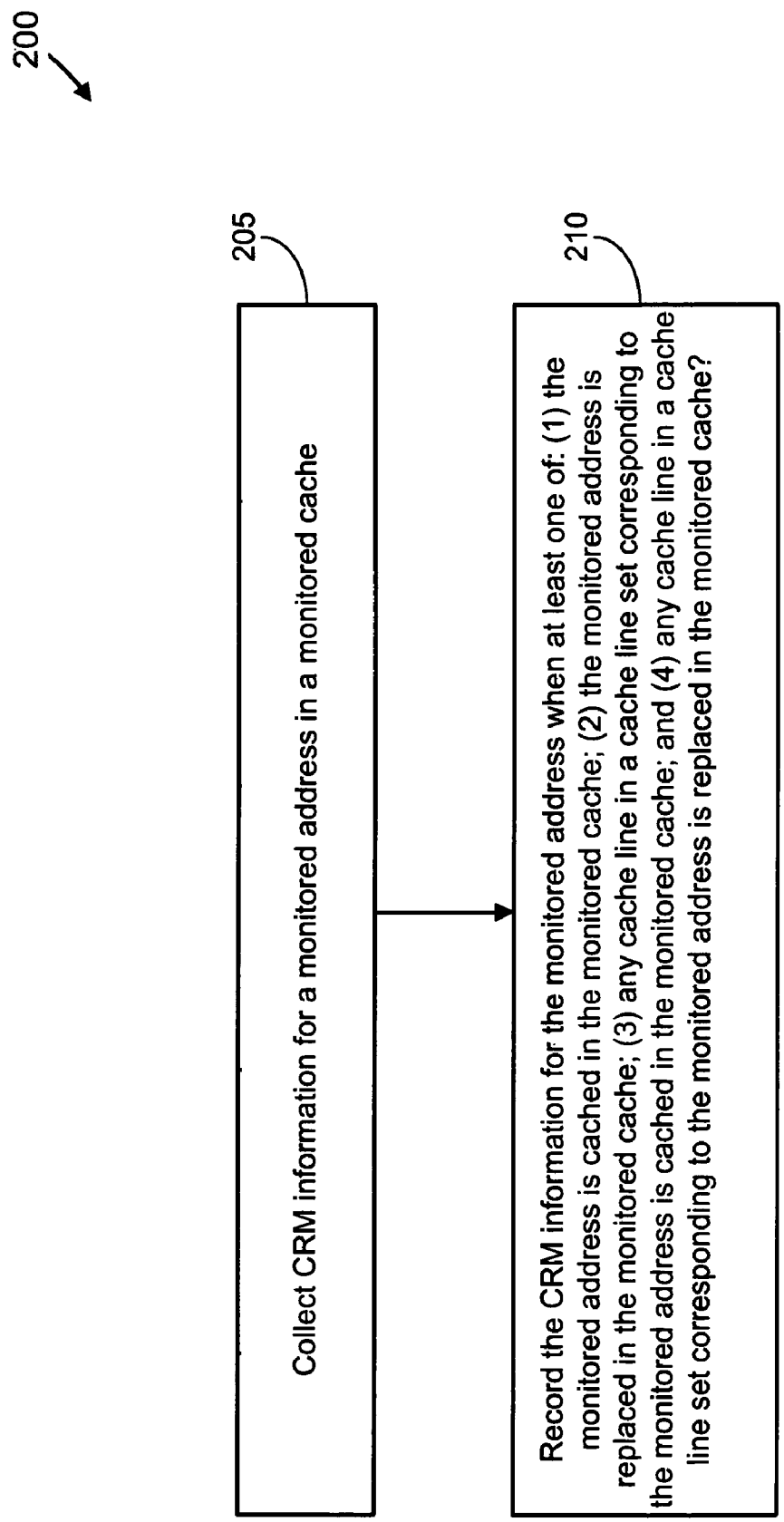
FIG. 2 depicts a flow diagram of a method of cache replacement monitoring in accordance with one exemplary embodiment of the present invention.

Referring now to FIG. 2, a method 200 of cache replacement monitoring (CRM) is shown, in accordance with one exemplary embodiment of the present invention. CRM information is collected (at 205) for a monitored address in a monitored cache. The CRM information is recorded (at 210) for the monitored address, when at least one of the following conditions occur: (1) the monitored address is cached in the monitored cache; (2) the monitored address is replaced in the monitored cache; (3) any cache line in a cache line set corresponding to the monitored address is cached in the monitored cache; and (4) any cache line in a cache line set corresponding to the monitored address is replaced in the monitored cache.

Figure 3:
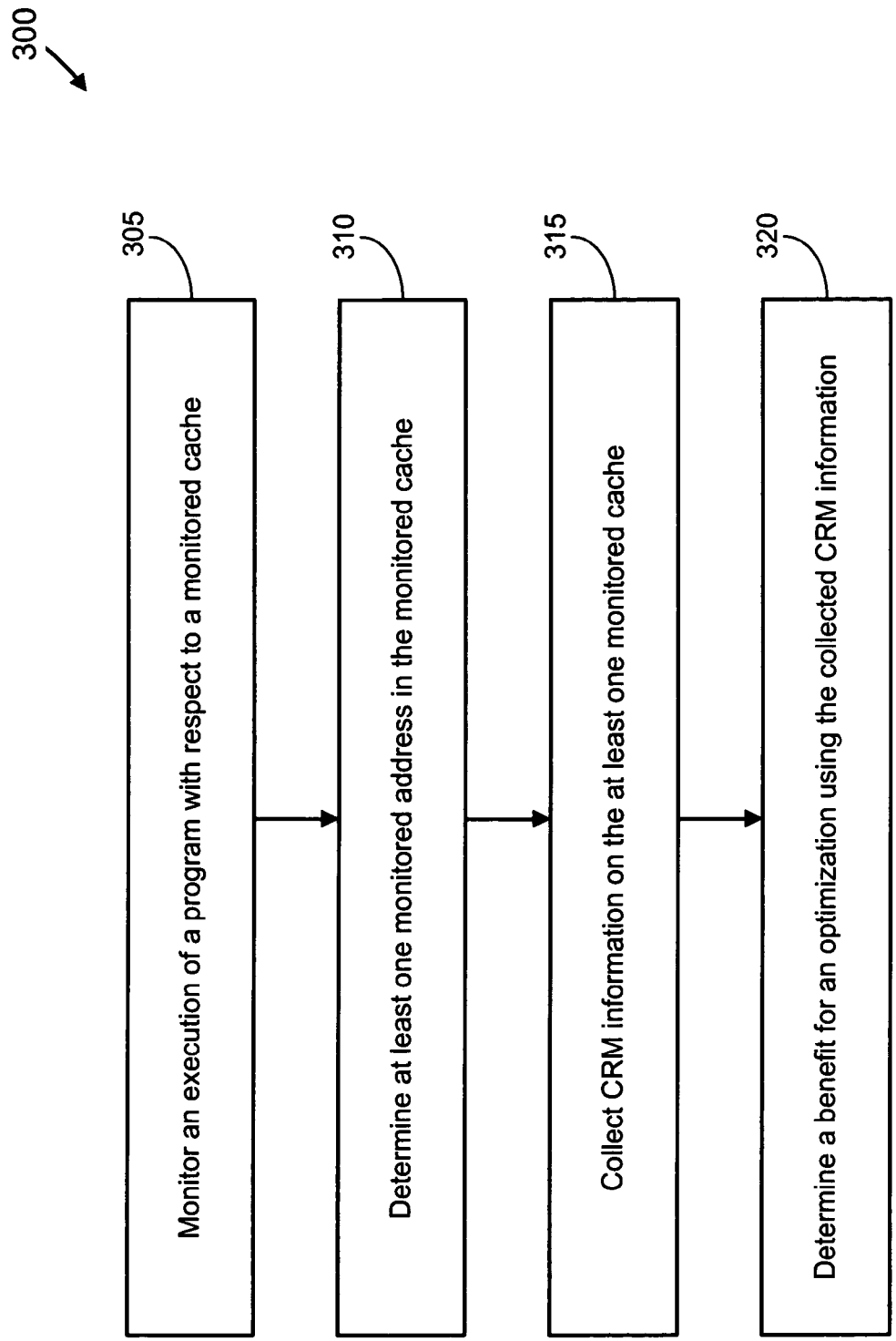
FIG. 3 depicts a flow diagram of a method for determining a benefit for an optimization, in accordance with one exemplary embodiment of the present invention.

Referring now to FIG. 3, a method 300 for determining a benefit for an optimization is shown, in accordance with one exemplary embodiment of the present, invention. An execution of a program is monitored (at 305) with respect to a monitored cache. At least one monitored address in the monitored cache is determined (at 310). CRM information on the at least one monitored address is collected (at 315). A benefit for an optimization is determined (at 320) using the collected CRM information.

The particular embodiments disclosed above are illustrative only, as the invention may be modified and practiced in different but equivalent manners apparent to those skilled in the art having the benefit of the teachings herein. Furthermore, no limitations are intended to the details of design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system for cache replacement monitoring (CRM), comprising:
  a monitored cache comprising a monitored cache line set, the monitored cache line set comprising at least one cache line holding data of a monitored address; and
  a CRM mechanism operatively associated with the monitored cache, wherein the CRM mechanism collects CRM information for the monitored address, wherein the CRM information includes the number of times the monitored cache line or any cache line, is replaced, memory addresses that have recently replaced the monitored cache line, or any cache line in the monitored cache line set; memory addresses that have recently been replaced by the monitored cache line, or any cache line in a monitored cache line set; and the time interval between two recent placements of the monitored cache line or any cache line in the monitored cache line set, wherein the time interval can be measured by a number of processor cycles, a number of instructions, a number of memory access instructions or a number of cache accesses,
  and wherein the CRM mechanism includes a CRM table with a plurality of table entries, each of the table entries is comprised of an address register ("AR") that records the memory address associated with a monitored cache line, a monitor register ("MR") that records the number of times the cache line has been replaced and records the number of times the monitored address is replaced in the monitored cache, and a conflicting address register ("CAR") that records one or more recent replacing memory address that have recently replaced the monitored cache line.

* * * * *